United States Patent [15] 3,649,247
Brondyke et al. [45] Mar. 14, 1972

[54] MELTING FINELY DIVIDED ALUMINUM SCRAP

[72] Inventors: Kenneth J. Brondyke, Oakmont; Paul D. Hess, Lower Burrell, both of Pa.

[73] Assignee: Aluminum Company of America, Pittsburgh, Pa.

[22] Filed: May 27, 1969

[21] Appl. No.: 828,339

[52] U.S. Cl. .................................75/68, 75/44, 75/65, 75/93 A, 75/93 B
[51] Int. Cl. ...........................................C22b 21/00
[58] Field of Search ...............75/93 A, 93 AB, 65, 68, 44

[56] References Cited

UNITED STATES PATENTS

| | | | |
|---|---|---|---|
| 1,291,672 | 1/1919 | Sutcliffe | 75/44 X |
| 2,802,732 | 8/1957 | Crolius | 75/44 |

*Primary Examiner*—L. Dewayne Rutledge
*Assistant Examiner*—J. Davis
*Attorney*—Carl R. Lippert

[57] ABSTRACT

In melting finely divided aluminum and aluminum alloy metal such as scrap, melt losses can be substantially reduced if the flux is combined with the metal pieces before they are melted.

4 Claims, No Drawings

MELTING FINELY DIVIDED ALUMINUM SCRAP

BACKGROUND OF THE INVENTION

One source of aluminum metal is finely divided scrap which may occur as ingot scalpings, or turnings, borings, chips and the like, produced in various machining operations. Finely divided aluminum includes aluminum and its alloys. This material has a typical bulk density of about 10 to 50 pounds per cubic foot, or more often 10 to 30. The scrap is usually first charged into a molten bath of aluminum in a furnace, or an extension of one, where it is melted. As a result of melting the scrap a surface layer of oxides, nitrides and entrapped metal known as skim develops which is treated with a flux to release as much as possible of the entrapped molten metal to the melt before removing the skim. When the skim is removed, it still contains some molten metal which is considered metal lost from the melt to the skim and, hence, the term "melt loss." Because of the large surface area of the fine scrap, there is a high degree of oxidation which occurs before melting is complete which causes excessively high melt losses, not only from loss of metal by the oxidation itself, but also from the large quantities of skim, or dross as it is often called, generated. Because of this large amount of skim, or dross, it is often quite difficult to release the entrapped molten metal which tends to become quite substantial.

STATEMENT OF THE INVENTION

In accordance with the invention, the aforementioned high melt losses are greatly reduced. This is accomplished by bringing together and into contact the scrap pieces and a suitable flux before the scrap is melted. That is, the flux is directed to the scrap pieces rather than to the skim generated by melting the scrap. It is believed that such is beneficial in two ways; one, from the melting of the flux on the scrap to provide a protective coating against metal oxidation during heat-up and melting, and the other from providing a fluxing action to the oxide already present on the surface of the solid scrap or oxide formed during melting. The net result is a substantially reduced production of skim or dross and entrapment of considerably less free molten metal in the skim. A still further advantage is that the operation of the skim treatment after melting can be eliminated. This results in considerable savings in cost and time. In the previous practice, the scrap is melted to produce the skim or dross with its entrained metal which is then treated with flux. The treatment involved applying the flux to the skim surface and manually pushing it into the flux with a knifing action called "puddling," a rather time-consuming operation. For the sake of safety, the furnace burners normally have to be slowed. Also, as much as 20 percent of the flux went up the stack because of the furnace draft. By the elimination of these hindrances, the furnace productivity is increased 15 percent and even more in practicing the invention. In addition, safety and fume generation factors are improved.

DESCRIPTION

Various flux compositions can be employed in practicing the invention. The flux should be of the so-called "melting" type as opposed to the so-called "ignition" type normally used for conventional skim treatment for aluminum melts. By a melting type flux is meant that type used for melting a metal rather than for treating a skim or dross. The flux should have a relatively low melting point, that is below the 1,300° to 1,400° F. temperature levels typically used in melting furnaces. The flux is usually a mixture of alkali metal and alkaline earth metal chlorides or fluorides or both, the components being chosen to provide a relatively low melting point along with protective action of the scrap and to provide a dewetting action to separate the various oxides from the molten aluminum metal. Suitable flux mixtures include the following:

40 to 50% KCl, 50 to 60% Mg$_3$Cl
40 to 50% NaCl, 45 to 55% KCl, 5% cryolite
40 to 50% NaCl, 45 to 55% KCl, 5% potassium aluminum fluoride Melting type fluxes are known in the art and don't need elaborated upon here. These melting type fluxes are, by the way, considerably less costly than the ignition type skim fluxes normally used in treating melts.

In the practice of the invention, it is essential that the flux and the finely divided aluminum be brought together or contacted prior to melting the aluminum as opposed to the conventional practice where the aluminum particles are first added to the melt and fluxed only to the extent they are incorporated into the skim. The specific technique of contacting the finely divided aluminum charge and the flux can be varied considerably in the practice of the invention. These techniques include but are not necessarily limited to the following:

1. tumbling the aluminum and flux particles as in a rotating drum arrangement,
2. electrostatic precipitation of flux particles onto the surfaces of the aluminum pieces,
3. applying the flux to a bulk of the finely divided aluminum such as where the aluminum is in a bulk container the flux is applied to the surface of the bulk of finely divided aluminum,
4. simultaneous and continuous addition of the flux and the finely divided aluminum in association with charging the furnace such as by conveyor feeding the scrap into the furnace while continuously adding flux to the scrap as it drops off the conveyor into the furnace.

The flux is applied in the form of relatively fine particles which may vary in size from about +10 to −400 mesh in the Tyler screen series. While this relatively wide variation may be utilized, it is preferred that the following guidelines by employed. Where the flux treatment is effected by tumbling together the flux and the finely divided aluminum, the flux particles should be within the range −80 +300 mesh. For instance, −100 mesh is highly suitable. For electrostatic precipitation, the flux should be about −50 +120 mesh or, suitably −80 mesh. For simultaneous flux-aluminum furnace introduction or for flux application to a bulk charge of divided aluminum, the flux particles can be much coarser, within a range of −10 to +200, −16 mesh being quite satisfactory.

The amount of flux employed is that amount found to be effective which is readily determined by observing that amount which produces the desired results. This amount varies with the size and nature of the aluminum pieces, their surface contamination, their composition and other factors and usually varies from about one-fourth to about 10 percent of the total weight of the finely divided aluminum charge. Previously, the flux was added based on the total melt charge which may include equal amounts of finely divided scrap and pig ingot, the flux usually amounting to about 1 pound flux per thousand pounds of melt. For best results, the divided aluminum should be relatively free of water and oil before the flux is applied since these contaminants increase oxidation and diminish the beneficial effects of the flux. In addition, the aluminum particles preferably should be at a relatively low temperature, not over 500° F., when the flux is applied so as to further minimize oxidation while heating the particles.

The finely divided aluminum usually amounts to only a portion of the total furnace charge, the balance being provided by other sources of aluminum. Accordingly, the flux and finely divided aluminum are added to the melt where the aluminum pieces enter and become a part of the melt while being treated with the flux. The result is the improvements described earlier. There is some skim produced but it is quite "dry," or free from entrained liquid aluminum, so that it can be skimmed off without any skim treatment.

In order to demonstrate the advantages derived from the practice of the invention, the following examples proceed.

EXAMPLE 1

Light gauge turnings of aluminum alloy 2024 having a nominal composition of Al, 4.5% Cu, 1.5% Mg and 0.6% Mn were treated in a gas-fired crucible to remove the oxide impurities. In the first treatment, the scrappings were melted in the conventional manner and the skim was treated with an ignition type skim flux, containing NaCl, AlF$_3$ and K$_2$SiF$_6$, which was puddled into the skim periodically. After separation of the skim and melt, the melt loss on the scrap was found to be 5.5 percent. In another treatment of like scrap, the scrap was first precoated by tumbling with 1 percent of a melting type flux containing about 45% NaCl, 50% KCl and 5% potassium aluminum fluoride. After tumbling, the scrap was introduced to the gas-fired crucible where it was melted. There was no skim treatment performed after melting and the melt loss on the scrap was found to be only 3.7 percent.

EXAMPLE 2

Dry ingot scalpings of aluminum alloy 6061, having a bulk density of 20–25 lb. per cu. ft. and a nominal composition of Al 1% Mg, 0.6% Si, 0.25% Cu and 0.2% Cr, were treated in a gas-fired crucible. In the first run, no treatment whatsoever was performed and the melt loss was 7.3 percent. In the second run, the skim was treated with an ignition type flux similar to that used in Example 1 using conventional techniques and the melt loss was 2.7 percent. In the third run, the same flux used for precoating in Example 1 was metered into the scrap as it was continuously charged into the molten aluminum bath and there was no skim treatment after melting. The amount of flux employed was 2 percent of the ingot scalpings charge. The melt loss in Run 3 was only 1.1 percent.

EXAMPLE 3

Chopped and delaquered can sheet scrap of alloy 5082, containing nominally 4.5% Mg, and having a bulk density of approximately 10.5 lb. per cu. ft. was added to a molten aluminum bath. When conventionally skim treated to recover entrained liquid metal, typical melt losses range from 5 to 6 percent. To determine the improvement realized in practicing the invention, a melting flux of the type employed in Examples 1 and 2 and having an average grain fineness of 60 mesh was metered into the scrap as it was continuously fed into the molten bath, the amount of flux being 3 percent of the weight of the scrap. The resulting melt loss was 3.7 percent with no flux treatment of the skim.

What is claimed is:

1. A method of recovering aluminum values from finely divided aluminum metal having a bulk density of 10 to 50 pounds per cubic foot comprising bringing into contact the finely divided aluminum metal and an effective amount of melting type flux prior to melting said aluminum metal and concurrently introducing said aluminum metal and said flux, both in particulate form, into a molten bath of aluminum to effect melting of said aluminum metal.

2. The method according to claim 1 wherein said flux is added in an amount ranging from one-fourth to 10 percent of the weight of said finely divided aluminum metal.

3. The method according to claim 1 wherein said flux and said finely divided aluminum metal are brought into contact while said aluminum metal is at a temperature not exceeding 500° F.

4. The method according to claim 1 wherein the skim generated in melting said finely divided aluminum metal is removed without further treatment.

* * * * *